(12) United States Patent
Ginsburg

(10) Patent No.: US 6,872,883 B2
(45) Date of Patent: Mar. 29, 2005

(54) MAST LIGHTING SYSTEM

(76) Inventor: Thomas A. Ginsburg, 1505 Bent Creek Dr., Southlake, TX (US) 76092

( * ) Notice: Subject to any disclaimer, the term of this patent is extended or adjusted under 35 U.S.C. 154(b) by 32 days.

(21) Appl. No.: 10/649,912

(22) Filed: Aug. 26, 2003

(65) Prior Publication Data

US 2004/0037084 A1 Feb. 26, 2004

Related U.S. Application Data

(63) Continuation-in-part of application No. 10/326,947, filed on Feb. 10, 2003, now abandoned, which is a continuation of application No. 09/893,290, filed on Jun. 27, 2001, now abandoned, which is a continuation of application No. 09/421,081, filed on Oct. 19, 1999, now Pat. No. 6,303,857.
(60) Provisional application No. 60/104,796, filed on Oct. 19, 1998.

(51) Int. Cl.[7] .................................................. E04H 12/00
(52) U.S. Cl. ....................... 174/45 R; 52/295; 52/296; 52/726.4; 362/153.1; 362/276; 362/431
(58) Field of Search ........................... 174/40 R, 45 R, 174/40 TD, 43, 44, 163 F; 52/295, 296, 726.4; 362/153.1, 276, 431

(56) References Cited

U.S. PATENT DOCUMENTS

| | | | |
|---|---|---|---|
| 342,552 A | 5/1886 | Westinghouse | |
| 946,251 A | 1/1910 | Moffitt et al. | |
| 1,157,026 A | 10/1915 | Meschenmoser | |
| 1,162,657 A | 11/1915 | Schweitzer | |
| 1,189,459 A | 7/1916 | Lundin | |
| 1,338,028 A | 4/1920 | Linehan | |
| 1,560,289 A | 11/1925 | Noll | |
| 1,776,682 A | 9/1930 | King | |
| 2,668,888 A | 2/1954 | Johnson | 200/129 |
| 2,775,745 A | 12/1956 | Eaton | 339/91 |
| 3,116,386 A | 12/1963 | Sperzel | 200/115.1 |
| 3,145,329 A | 8/1964 | Deakin et al. | 317/234 |
| 3,187,175 A | 6/1965 | Lang | 240/84 |
| 3,225,224 A | 12/1965 | Rydbeck | 307/157 |
| 3,242,252 A | 3/1966 | Bergenstein | 174/38 |
| 3,300,570 A | 1/1967 | Spiece et al. | 174/38 |
| 3,356,806 A | 12/1967 | Urani | 200/129 |
| 3,364,635 A | 1/1968 | Guggemos | 52/122 |
| 3,417,359 A | 12/1968 | Urani | 337/201 |

(Continued)

FOREIGN PATENT DOCUMENTS

| | | |
|---|---|---|
| DE | 30 36 629 A1 | 5/1982 |
| EP | 0 334 609 B1 | 9/1989 |
| EP | 0 334 610 B1 | 9/1989 |
| FR | 1438539 | 4/1966 |

OTHER PUBLICATIONS

Florida Department of Transportation, Metal Pole Wiring Specifications, (8/78).

(Continued)

*Primary Examiner*—Dean A. Reichard
*Assistant Examiner*—Adolfo Nino
(74) *Attorney, Agent, or Firm*—Needle & Rosenberg, P.C.

(57) ABSTRACT

A mast lighting system of the type including at least one mast that is mountable onto a foundation. A portion of the mast is capable of supporting an electrical component. A distribution component subassembly is disposed within a power distribution assembly. An electrical cable disposed within the mast connects the electrical component to the distribution component subassembly of the power distribution assembly through a breakaway connector set. A remote power source is in communication with the distribution component subassembly. The mast defines an interior chamber therein of sufficient dimensions to receive the power distribution assembly. The power distribution assembly is disposed within the chamber and onto a generally planar surface of the foundation. In use, the power distribution assembly is protected from collision damage, but is accessible to the user through the opening in the mast.

61 Claims, 10 Drawing Sheets

U.S. PATENT DOCUMENTS

| | | | |
|---|---|---|---|
| 3,518,600 A | 6/1970 | Urani | 337/201 |
| 3,710,296 A | 1/1973 | Urani | 337/213 |
| 3,753,192 A | 8/1973 | Urani | 337/201 |
| 3,760,234 A | 9/1973 | Jones et al. | 317/111 |
| 3,761,865 A | 9/1973 | Bomgaars et al. | 339/60 R |
| 3,862,411 A | 1/1975 | Persson | 240/25 |
| 3,863,189 A | 1/1975 | Urani | 337/213 |
| 3,945,320 A | 3/1976 | Gibson et al. | 102/27 R |
| 4,072,857 A | 2/1978 | DeVicaris | 362/123 |
| 4,138,181 A | 2/1979 | Hacker et al. | 339/45 R |
| 4,214,806 A | 7/1980 | Kraft | 339/242 |
| 4,237,530 A | 12/1980 | Murray et al. | 362/418 |
| 4,392,192 A | 7/1983 | Steadman | 362/418 |
| 4,542,437 A | 9/1985 | Ellis et al. | 361/386 |
| 4,568,137 A | 2/1986 | Leuthold | 339/147 R |
| 4,617,768 A | 10/1986 | Gebelius | 52/40 |
| 4,684,192 A | 8/1987 | Long et al. | 439/374 |
| 4,698,717 A | 10/1987 | Scheid | 361/1 |
| 4,702,537 A | 10/1987 | Mattingly et al. | 439/152 |
| 4,707,046 A | 11/1987 | Strand | 439/314 |
| 4,734,059 A | 3/1988 | Melugin | 439/621 |
| 4,759,730 A | 7/1988 | Sappington et al. | 439/622 |
| 4,827,389 A | 5/1989 | Crum | 362/388 |
| 4,836,802 A | 6/1989 | Phillips | 439/622 |
| 4,878,160 A | 10/1989 | Reneau et al. | 362/269 |
| 4,909,761 A | 3/1990 | Muguira | 439/622 |
| 4,911,652 A | 3/1990 | Savoca et al. | 439/282 |
| 4,914,258 A | 4/1990 | Jackson | 174/45 R |
| 4,968,264 A | 11/1990 | Ruehl et al. | 439/622 |
| 4,997,394 A | 3/1991 | Katz et al. | 439/622 |
| 5,018,991 A | 5/1991 | Katz et al. | 439/621 |
| 5,060,437 A | 10/1991 | Parsons et al. | 52/298 |
| 5,069,631 A | 12/1991 | Bauer et al. | 439/159 |
| 5,080,600 A | 1/1992 | Baker et al. | 439/258 |
| 5,161,874 A | 11/1992 | Benes | 362/32 |
| 5,243,508 A | 9/1993 | Ewing et al. | 362/431 |
| 5,267,880 A | 12/1993 | Tamm | 439/622 |
| 5,335,160 A | 8/1994 | Savoca | 362/431 |
| 5,483,019 A | 1/1996 | Tourigny | 174/45 R |
| 5,726,507 A | 3/1998 | Tipton | 307/147 |
| 5,820,255 A | 10/1998 | Carrington et al. | 362/431 |
| 5,993,246 A | 11/1999 | Moldenhauer et al. | 439/474 |
| 6,303,857 B1 | 10/2001 | Ginsburg | 174/45 R |
| 6,327,833 B1 | 12/2001 | Miskelley et al. | 52/726.4 |
| 6,340,790 B1 | 1/2002 | Gordin et al. | 174/45 R |

OTHER PUBLICATIONS

Buchanan Construction Products, Inc., Catalog, Waterproof Breakaway Streetlight Connector and Splice Insulating Kits (undated).
Bussmann, Catalog, Small Dimension Fuses, Fuseholders, Blocks and Accessories (undated).
Bussmann, Catalog, Fuseblocks, Holders and Disconnect Switches (undated).
Littelfuse, Catalog, Axial Lead and Cartridge Fuses (undated).
ITT Cannon, Catalog, Sure Seal Connectors and Accessories (undated).
General Electric Company, Airport Lighting—High Intensity Runway; Runway and Threshold Marker Lights (Feb. 4, 1952).
State of Louisiana, Department of Highways, Standard Specifications for Road and Bridges, (10/71).
Buss, Tron In–the–Line Waterproof Fuse Holders with Optional Break–A–Way Receptacles for Street & Highway Lighting Standards, (6/84).
Light Pole Installation Details, (11/86).
Breakaway and Tap Connector Diagram, (11/86).
Bussman, Buss Electronic Fuses and Small Dimension Fuses, (4/86).
Breakaway Transfer Base and Light Pole Connections, (3/90).
Littelfuse, Catalog, (2/73).
Bussman, TRON Breakaway Fuseholder Assembly, (2/73).
Roger L. Brockenbrough; Kenneth K. Broedecker, Highway Engineering Handbook Building and Rehabilitating the Infrastructure (1996) (pp. 7.96–7.138).
Bussman, TRON In–the–Line Waterproof Fuseholder, (undated).
$MG^2$, Duraline, Modular Cable Distribution Systems—A Safer Alternative to Roadway and Highmast Lightpole Wiring, (undated).
Littelfuse PowrGard Products Catalog (1993).
Bussman, Cooper Industries, Buss Electronic and Small Dimension Fuses Catalog SFB (Jun. 1986).
Homac Manufacturing Company Product Catalog (Mar. 1987).
Buchanan Construction Products, Inc. Catalog (1995).
Amerace Corporation, Elastimold 600 Volt Waterproof Connector Kits Catalog, Rev. 1 (Dec. 1984).
State of California Dept. of Transportation Standard Plans and Specifications (1999, 1997, 1995, 1992 and 1988).
Montana Dept. of Highways & Montana Highway Commission, Standard Specifications for Road and Bridge Construction, 1987 Edition (effective Jan. 1, 1987).
Montana Dept. of Highways & Dept. of Transportation Federal Aid Projects Specifications (1989–1992).
Buchanan, Buchanan Construction Products Catalog, (undated).
Buchanan, Buchanan Technical Data Sheets (Oct. 1, 1988).

MAST LIGHTING SYSTEM

RELATED U.S. APPLICATION DATA

This application is a continuation-in-part of, and claims priority to, U.S. application Ser. No. 10/326,947, filed Feb. 10, 2003, now abandoned, which is a continuation of, and claims priority to, U.S. application Ser. No. 09/893,290, filed Jun. 27, 2001, now abandoned, which is a continuation of, and claims priority to, U.S. application Ser. No. 09/421,081, filed Oct. 19, 1999, which issued as U.S. Pat. No. 6,303,857 on Oct. 16, 2001, which claims priority to U.S. Provisional Application Ser. No. 60/104,796 filed on Oct. 19, 1998. The Ser. Nos. 10/326,947, 09/893,290, 09/421,081, and 60/104,796 applications are herein incorporated in their entirety.

BACKGROUND

1. Field of the Invention

The invention relates to mast mounted outdoor lighting systems for illuminating roadways, sidewalks, parking lots or the like, and specifically to a mast mounted lighting system having a power distribution assembly may be stored within the base of the mast and is readily accessible by the user through the base of the mast.

2. Background Art

Outdoor mast lighting systems are well known in the prior art. Such systems commonly are supported above the surface to be lighted by a long pole or mast. Masts are typically hollow, and may be round, square or of any selected cross-sectional shape which provides adequate stability. The mast may include a breakaway base at its lower end having an opening (or "handhole") therein, through which the interior of the mast may be accessed by maintenance or installation personnel. The mast is mounted on a foundation of concrete or other suitable material set permanently into the ground and may be affixed to the foundation by a plurality of anchor bolts set into the foundation, which engage corresponding holes in the breakaway base.

Suspended at the top of the mast is an electrical component, commonly an electric light. In some applications, a cantilevered secondary mast supports the light over a street or sidewalk. In other applications, a ring of high-intensity lamps may be supported radially around the distal end of the mast. The electrical component is electrically connected to a power source, generally in series with a plurality of other commonly powered mast units in a given area.

Power delivery to each mast unit in a commonly powered system has been accomplished in a variety of ways in the prior art. In one such system, the output of a master circuit breaker may be connected to an electric power cable which runs to the base of the mast unit. The power cable connects to a fuse and surge arrestor assembly disposed within the hollow mast, which prevents current surges caused by lightning, voltage spikes or other anomalies from damaging the light fixture or the master circuit breaker. Access to the fuse and surge arrestor assembly is commonly provided by locating the fuse and surge arrestor assembly adjacent a handhole, or access hole, in the mast.

The performance of such a system is impaired by several shortcomings. Wire and cable attachments are generally made by splices, which are vulnerable to failure when tensile forces are applied to the connections. Because of the vertical orientation of the cable sections, gravitational forces are exerted at all times on the spliced connections which may tend to come apart. In catastrophic failure, such as that caused by a collision by an automobile or truck, the spliced connections are likely to disconnect, causing an interruption in service throughout the grid, and exposing dangerously "hot" wires.

In another prior art system, the fuse and surge arrestor assembly is located in a remote underground manhole. Such a system requires significantly greater expense and space to install, as a remote hole must be dug and maintained for each lighting unit within the grid, and additional cable is required to accommodate the remotely located electrical components.

SUMMARY OF THE INVENTION

The disadvantages of the prior art are overcome by the present invention which, in one aspect, is a mast lighting system. The lighting system includes at least one conventional mast having a proximate end and an opposite distal end. The distal end is capable of supporting an electrical component, such as a street lamp, and the proximate end is mounted to a foundation, at least a portion of which has a generally planar surface. The surface of the foundation defines an aperture for a conduit therein through which an electrical power cable that is in communication with a power source may be passed. Typically, the mast is mounted onto the planar surface of the foundation so that the proximate end of the mast overlies the aperture in the foundation. The proximate end of the mast defines an opening in communication with an interior chamber.

A power distribution assembly that is sized and shaped for receipt within the interior chamber of the mast is provided. The user may access the power distribution assembly through the opening in the mast. The power distribution assembly has a casing and a distribution power subassembly disposed within an interior of the casing. The casing defines a plurality of opening therein, which can include a first opening in an upper portion of the casing and a second opening in a bottom portion of the casing. The casing of the power distribution assembly is disposed within the interior chamber of the mast such that the second opening of the casing overlies the aperture of the surface.

The power distribution assembly has a first detachable connector that is connected to the first opening of the casing. An electrical cable is disposed within a portion of the mast and is communication with the electrical component and a second detachable connector. In use, the first detachable connector is detachably mated to the second detachable connector. In addition, the electrical cable that is disposed within the conduit is coupled to the distribution component subassembly so that power from the power source may be communicated to the electrical component.

DETAILED DESCRIPTION OF THE INVENTION

The present invention is more particularly described in the following examples that are intended as illustrative only since numerous modifications and variations therein will be apparent to those skilled in the art. Thus, the embodiments of this invention described and illustrated herein are not intended to be exhaustive or to limit the invention to the precise form disclosed. They are chosen to describe or to best explain the principles of the invention and its application and practical use to thereby enable others skilled in the art to best utilize the invention. As used in the specification and in the claims, "a," "an," and "the" can mean one or more, depending upon the context in which it is used. The preferred embodiment is now described with reference to the figures, in which like numbers indicate like parts throughout the figures.

Figure 1:
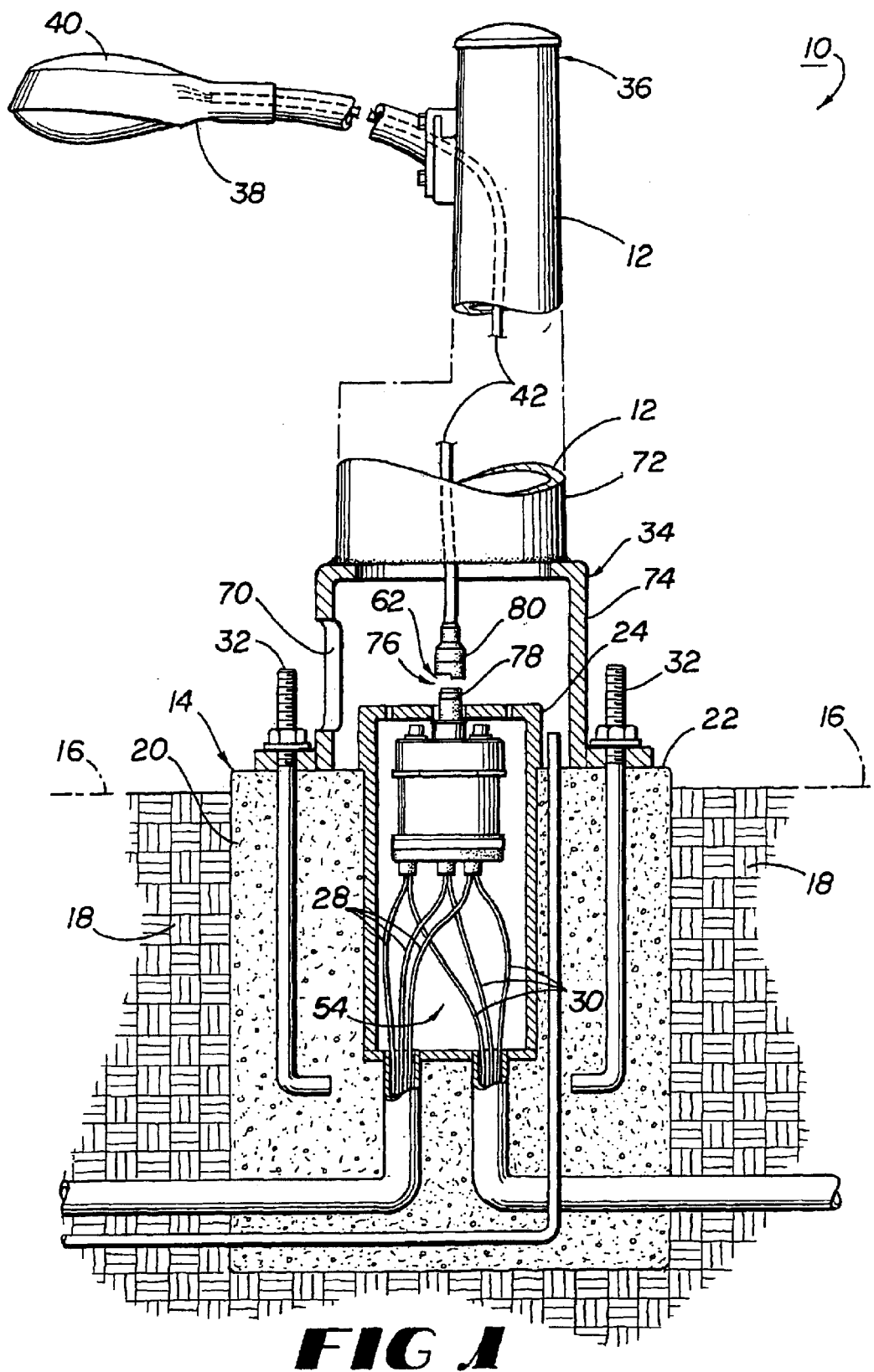
FIG. 1 is a side view of an embodiment of the improved mast lighting system with a portion shown in vertical cross-section.
Figure 10:
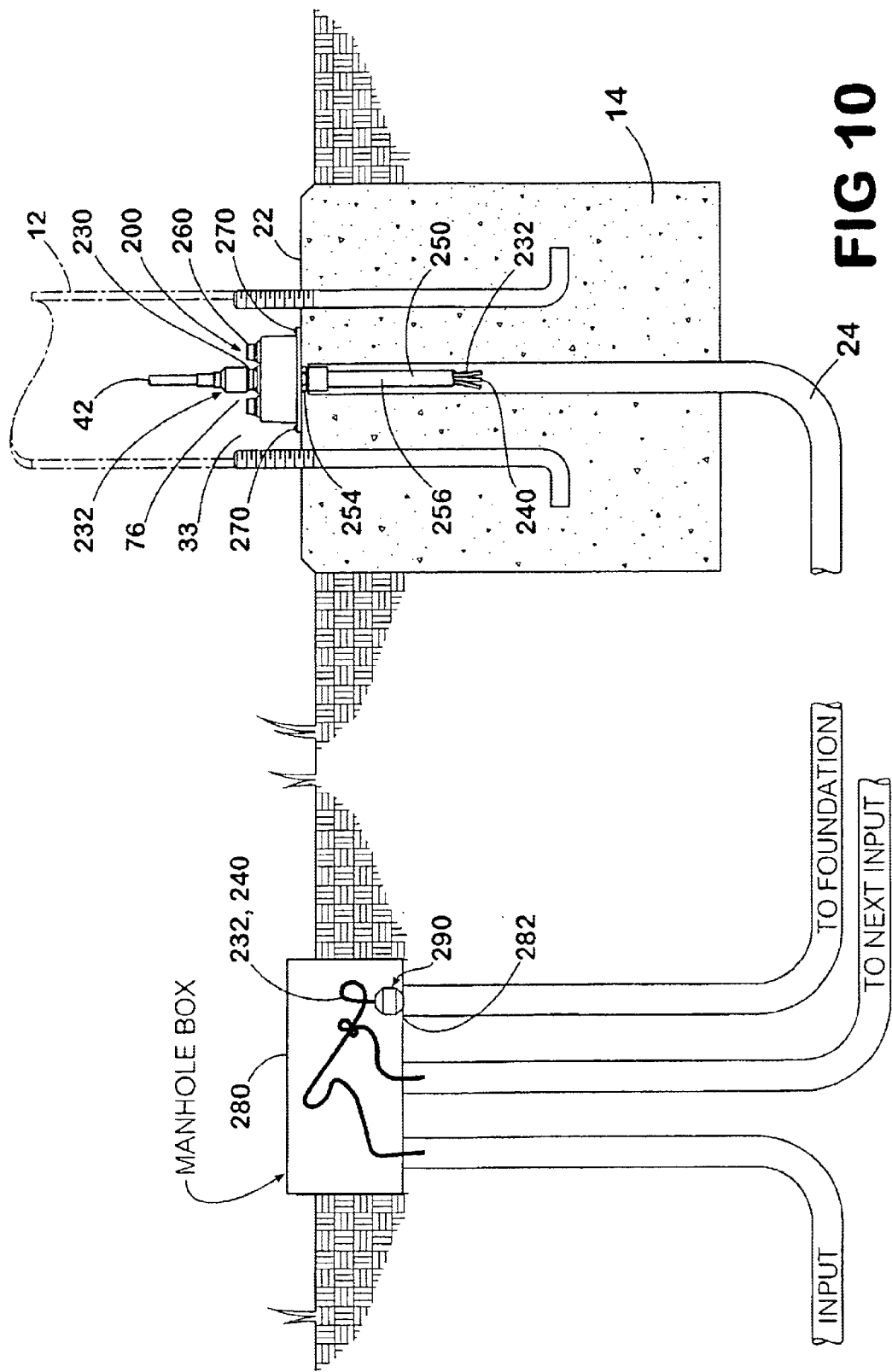
FIG. 10 is a side view of an alternative embodiment of the mast lighting system of the present invention with a portion shown in vertical cross-section, the power distribution assembly shown disposed onto a surface of the foundation.

Referring first to FIGS. 1 and 10, a mast lighting system 10 is described, of the type having at least one mast 12 mounted to a foundation 14. In one example, at least part of the foundation 14 extends below the grade 16 of the surrounding ground 18, whether installed in a parking lot, highway shoulder, sidewalk, or other environment. The foundation 14 commonly includes a pedestal 20 of concrete, but may be constructed of other materials capable of providing a stable base for the lighting system 10. In one example, a least a portion of a generally planar surface 22 of the pedestal 20 of the foundation 14 is at or above the level of the surrounding grade 16. In another example, at least a portion of the generally planar surface 22 of the foundation 14 is at or below the level of the surrounding grade 16. The pedestal 20 is poured around a conduit 24, such as, for example, the illustrated central conduit, through which underground electrical feeder wires 28, 30 are extended. The incoming feeder wires 28 convey electrical power to the lighting unit, either from a common power source (a remote circuit breaker, not shown) or from the outgoing feeder wires 30 of an adjacent lighting unit (not shown). As shown in FIG. 10, the surface 22 defines an aperture 25 for the conduit 24.

The mast 12 is rigidly attached to the pedestal 20 by welding, by a plurality of anchor bolts 32, or other conventional connections. The portion of the anchor bolts 32 set into the concrete pedestal 20 that vertically extend above the surface 22 may provide added protection to components in the central conduit 24 from side impact with the pedestal 20, as from an automobile collision. Such protection may also be provided by a variety of protection systems fixed to the pedestal 20, such as a stable collar or other guardrail (not shown) extending around the central conduit 24. As defined in this specification, the term "foundation" is intended to include the pedestal 20 and any anchor bolts 32 or other such devices which provide protection from side impact to the pedestal 20 and central conduit 24.

Figure 9:
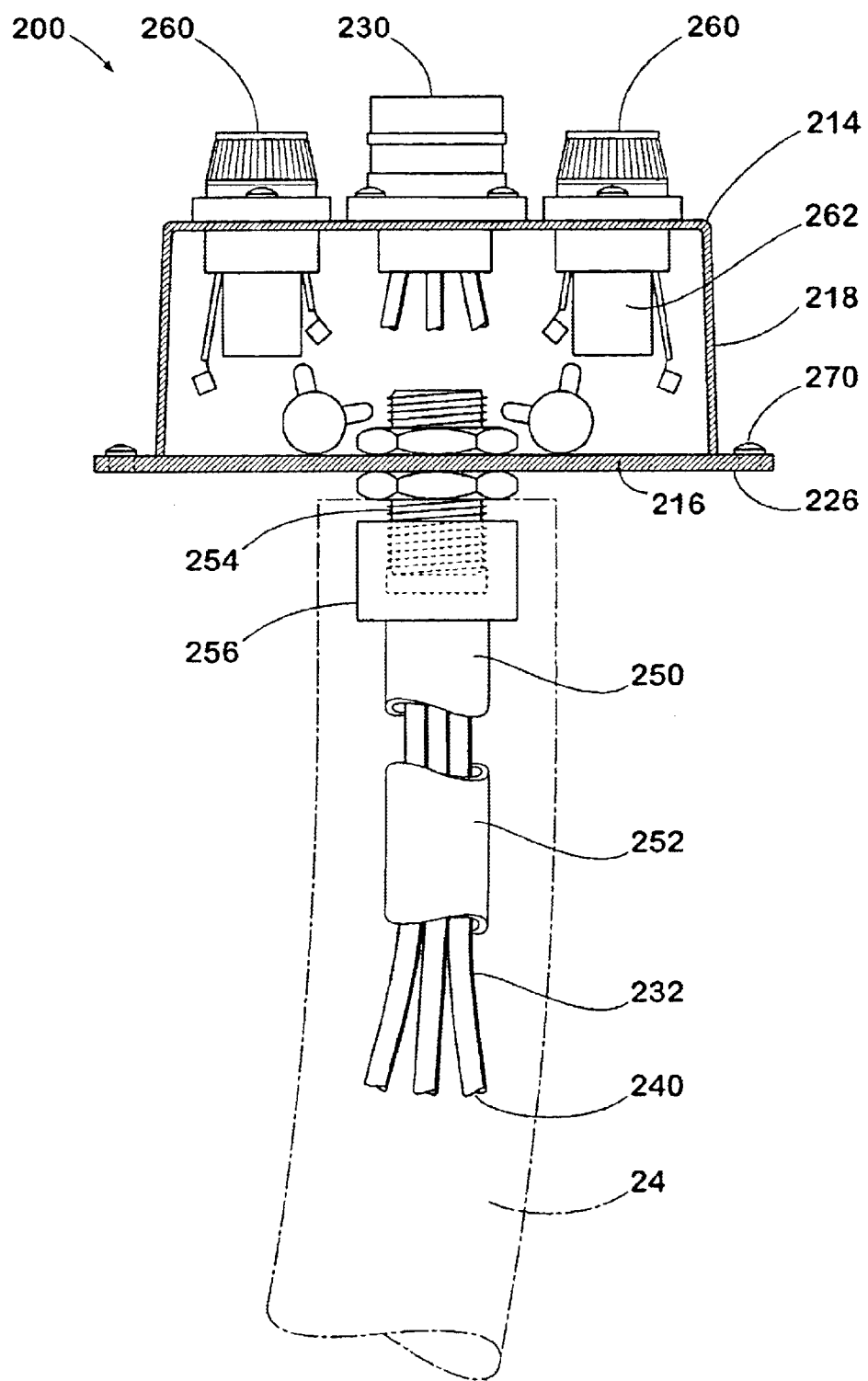
FIG. 9 is a vertical partial cross-sectional view of the second embodiment of the power distribution assembly.

The mast 12 is commonly constructed of tubular aluminum, but may be of any suitable material, including concrete, steel or fiberglass. The mast 12 may also be of any selected cross section, including circular or square. The mast 12 has a proximate end 34 and an opposite distal end 36. As shown in FIG. 9, the proximate end 34 of the mast 12 is connected to the surface 22 of the foundation so that an interior chamber 31 is defined within the proximate end 34 of the mast 12. The interior chamber may overlie the aperture 25 of the conduit in the foundation 14.

At least a portion of the mast is constructed and arranged to support an electrical component 38. The electrical component 38 may be a conventional street lamp 40, a high-watt high mast lighting system (not shown), or other desired device. A first electrical cable 42 connects the electrical component 38 to a distribution component subassembly 44. The first electrical cable 42 is preferably sized for standard mast height at 14-3 SOW and through the hollow interior of the mast 12. As one will appreciate, other embodiments of the first electrical cable may be utilized, including commercially available mast lighting cables (not shown), or even a simple 3 wire cable having 14 gauge conductors (not shown).

In one example and referring now to FIGS. 1–5, the central conduit 24 within the pedestal 20 and any anchor bolts 32 or other protective device that protrude above the upper surface 22 of the pedestal 20 define a chamber 54 within the foundation 14. The distribution component subassembly 44 is located within that chamber 54, such that no portion of the distribution component subassembly 44 protrudes above the horizontal plane marked by the highest point of the foundation 14. In the illustrated embodiment, the top of the anchor bolts 32 define the highest part of the foundation 14. Location of the distribution component subassembly 44 within the foundation 14 thus provides optimal protection from side impact damage due to traffic accidents or other collisions.

In this example, the central conduit 24 may be constructed of pressure treated cylindrical PVC tubing or galvanized rigid steel piping of 6" diameter. Here, the central conduit 24 is closed at its bottom end by a base 56, having access holes 58 therethrough to allow passage of the incoming and outgoing feeder wires 28, 30 into the chamber 54. The base 56 thus forms the lower boundary of the chamber 54. Horizontal rebar (not shown) may be provided through the central conduit 24 and extending into the surrounding pedestal 20 for securing the central conduit 24 to the pedestal 20 after the concrete sets. A top retaining cap 57 with one or more weep holes 59 and a centrally disposed connector hole 60 therethrough to accommodate an electrical connector 62 may be provided to enclose the upper end of the central conduit 24. The retaining cap 57 may be attached to the central conduit 24 by complementarily threaded engagement between the retaining cap 57 and the central conduit 24. Alternatively, the retaining cap 57 may be omitted, or alternate means of engagement of the retaining cap 57 to the central conduit 24 may be provided.

Figure 2:
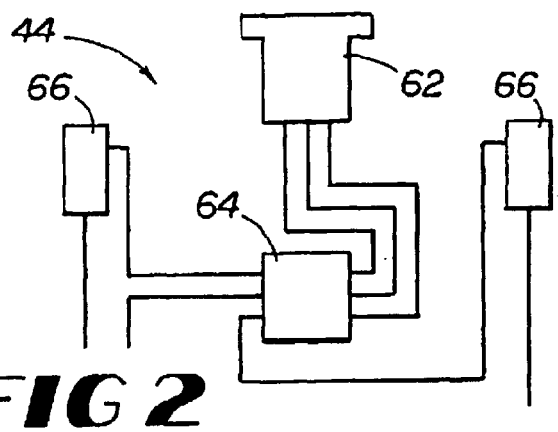
FIG. 2 is a wiring schematic of an embodiment of the distribution component subassembly.
Figure 11:
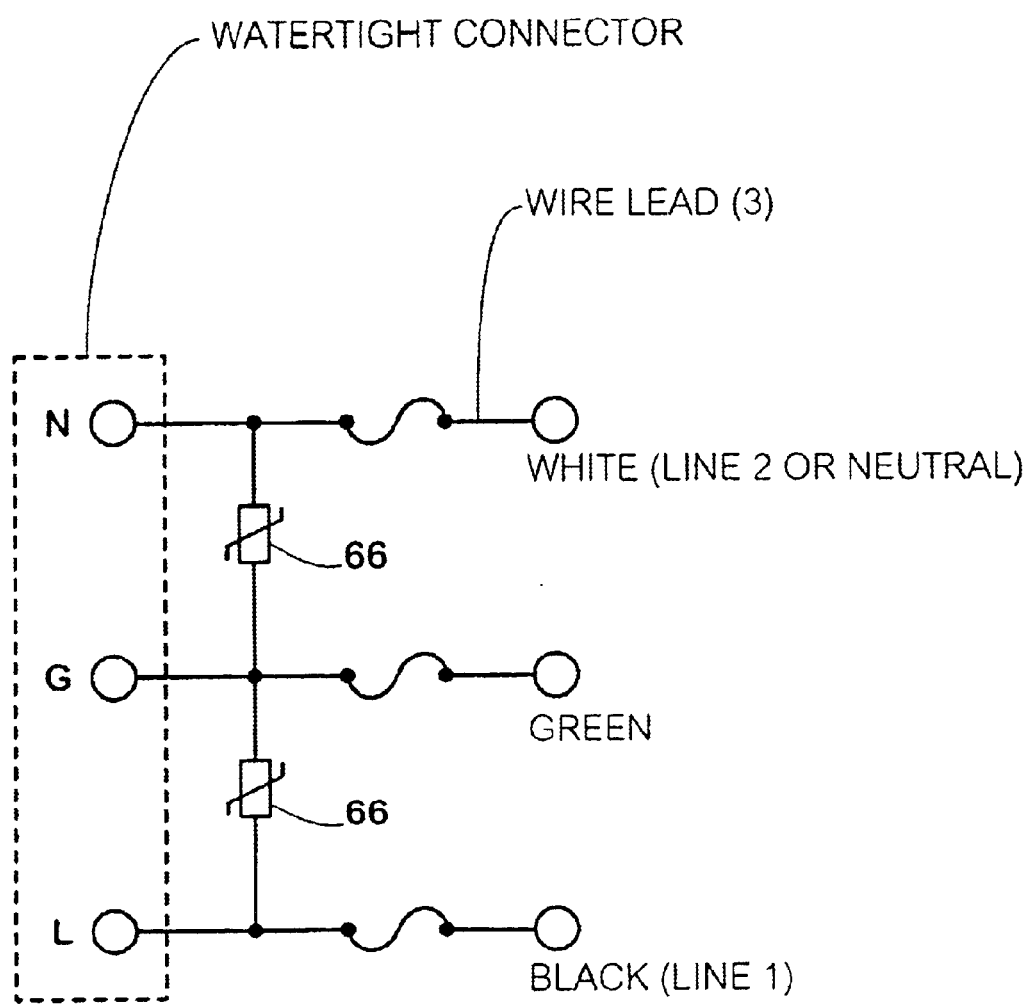
FIG. 11 is a wiring schematic of an embodiment of a distribution component subassembly.

Referring now to FIGS. 2 and 11, the distribution component subassembly 44 includes, in one example, a surge arrestor 64 and one or more fuses 66. In the illustrated example, two fuses 66 are included, one on each side of an electrical connector 62 which connects the distribution component subassembly 44 to the electrical cable 42. Individual components may be connected via standard wiring, with or without the use of contact blocks (not shown) mounted to a board (not shown). Conventional fuses may be utilized, whether free standing or contained in an integrated externally accessible fusing assembly, described in further detail below.

Commercially available components from a variety of manufacturers may be utilized in the distribution component subassembly 44, such as fast-acting type axial fuses from Littelfuse, Inc., and surge arrestors manufactured by Colomer, Inc. (including its 32 mm P/N D78 ZOV551 RA620).

The mast 12, near the proximate end 34 which is mounted to the foundation 14, defines an opening or handhole 70, through which the chamber 54 is accessible by the user. The handhole 70 may extend through the main body 72 of the mast 12 itself, or through a breakaway base portion 74 of the mast 12 at its proximate end 34. The location of the opening or handhole 70 should be near enough to the foundation 14 and chamber 54 therein that the distribution component subassembly 44 is accessible by hand to maintenance or installation personnel, thereby simplifying routine maintenance and repair to be performed on the mast lighting system 10. The handhole 70 may be covered between repairs or maintenance by a cover or door (not shown).

In one embodiment, the electrical connector 62 between the distribution component subassembly 44 and the electrical cable 42 is a watertight breakaway connector set 76, including a watertight female inlet 78 and a watertight male plug 80. In one embodiment, the female inlet 78 is connected to the distribution component subassembly 44, and the male plug 80 is connected to the electrical cable 42. The breakaway connector set 76 preferably disengages under an applied force, such as a tensile and/or sheer force that may be applied when a mast 12 fails due to vehicular impact. In any event, the force required to disengage the breakaway connector set 76 is less than the force necessary to damage the electrical cable 42, the breakaway connector set 76, and/or electrical connections thereto. The breakaway connector set 76 may utilize a positive key alignment to reduce the chance of equipment damage due to mismatching. When the breakaway connector set 76 is properly mated and locked, it preferably forms an enclosure which meets code requirements, such as Nema 4-4X, 6-6P, plus IP 67.

Use of a breakaway connector set 76 in the mast lighting system 10 prevents broken wires and de-energization of a complete circuit when one component such as a mast 12 fails. The breakaway connector set 76 separates safely under application of a predetermined force level, eliminating danger and electrical shock. When it comes time to replace a failed mast 12, the existing electrical cable 42 can be re-used or replaced without replacing the underground feeder wires 28, 30, distribution component subassembly 44 or the breakaway connector set 76. In one example, a Nema 6, IP 67 rated breakaway connector set 76, which is rated for 15 amps, 480 volts, and which safely disengages under a tension of 7.5 lb may be used. In an alternative example, a breakaway connector set from Sure Seal Connections (ITT Canon P/N 120-1869-000 and 120-1870-000) may be utilized.

Figure 3:
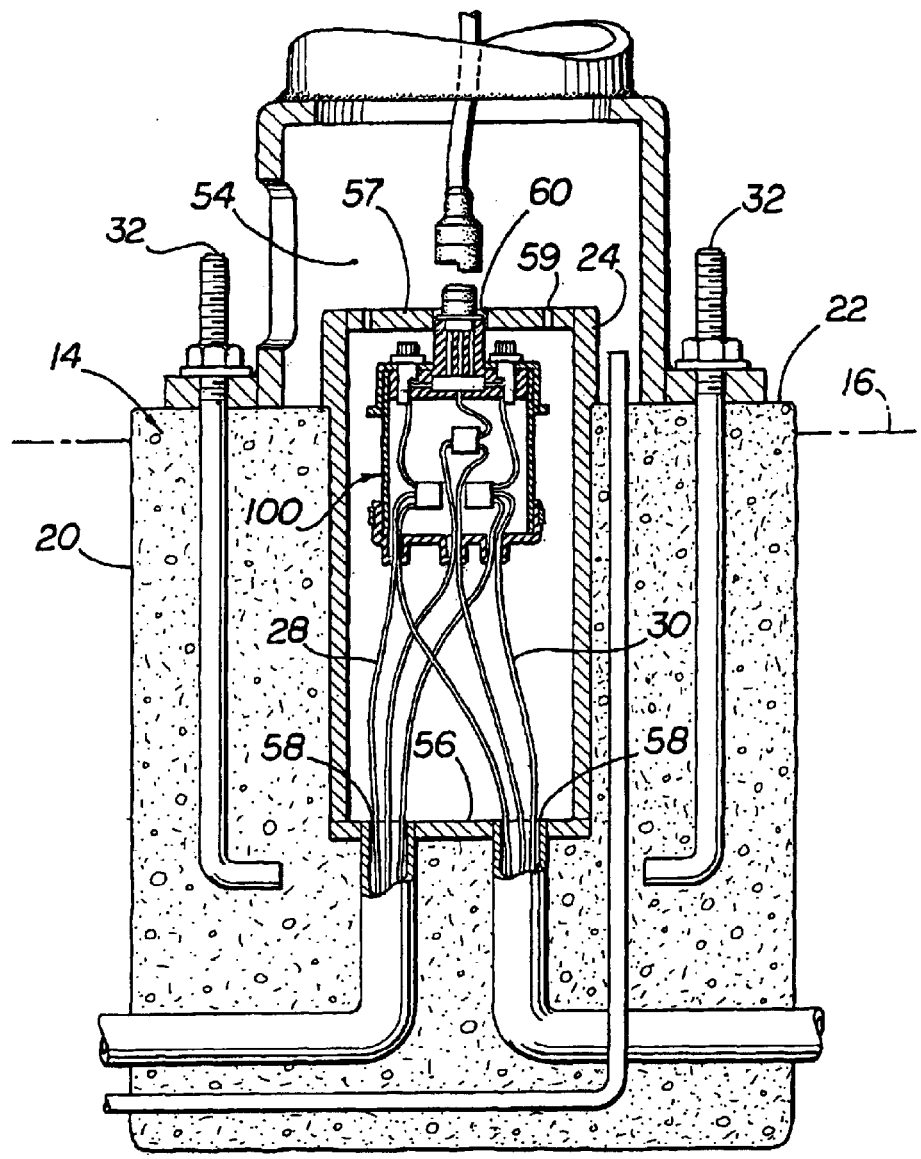
FIG. 3 is a vertical cross-sectional view of an embodiment of the improved mast lighting system, detailing the foundation and the casing.
Figure 4A:
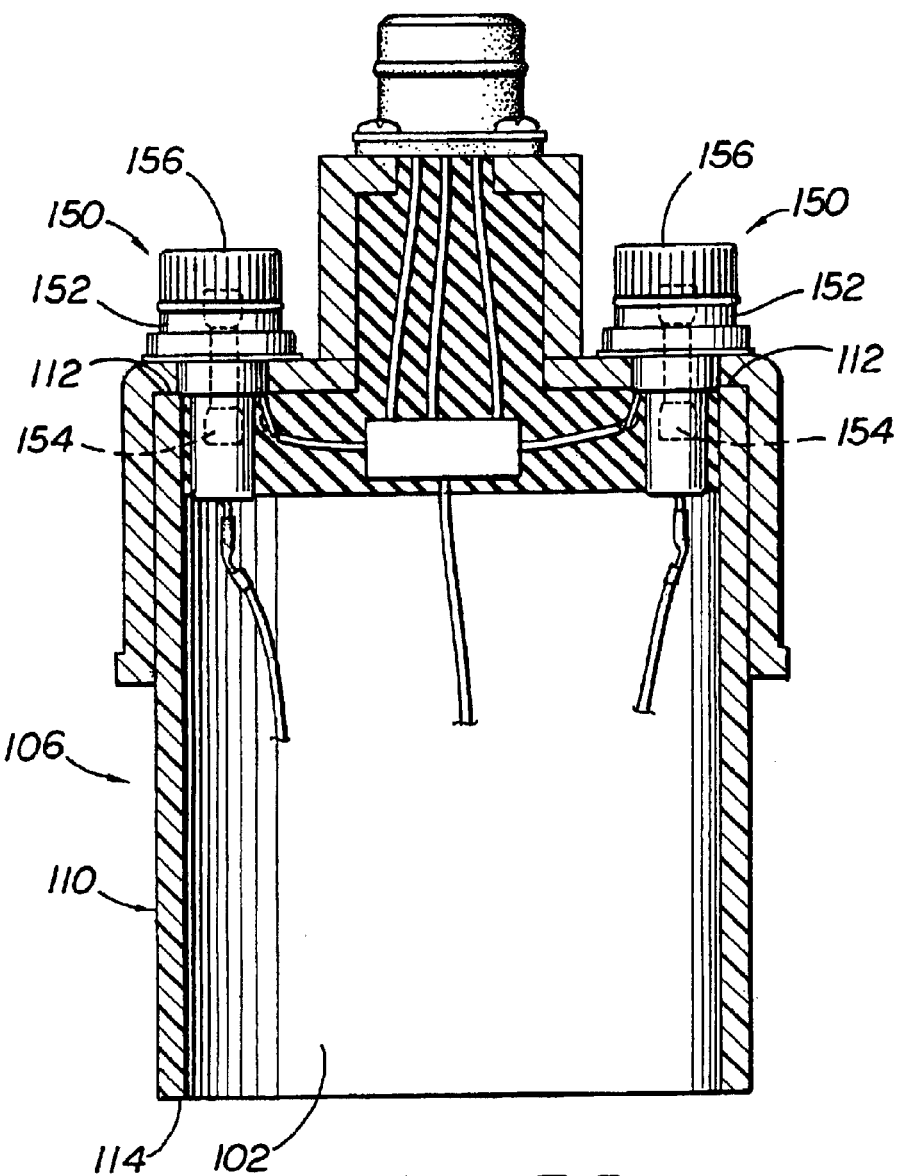
FIG. 4A is a vertical cross-sectional view of an embodiment of the pot.
Figure 4B:
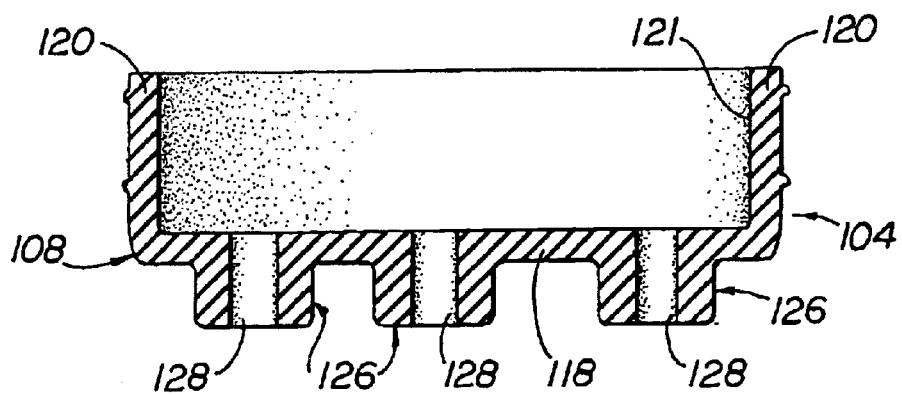
FIG. 4B is a vertical cross-sectional view of an embodiment of the cap.
Figure 4C:
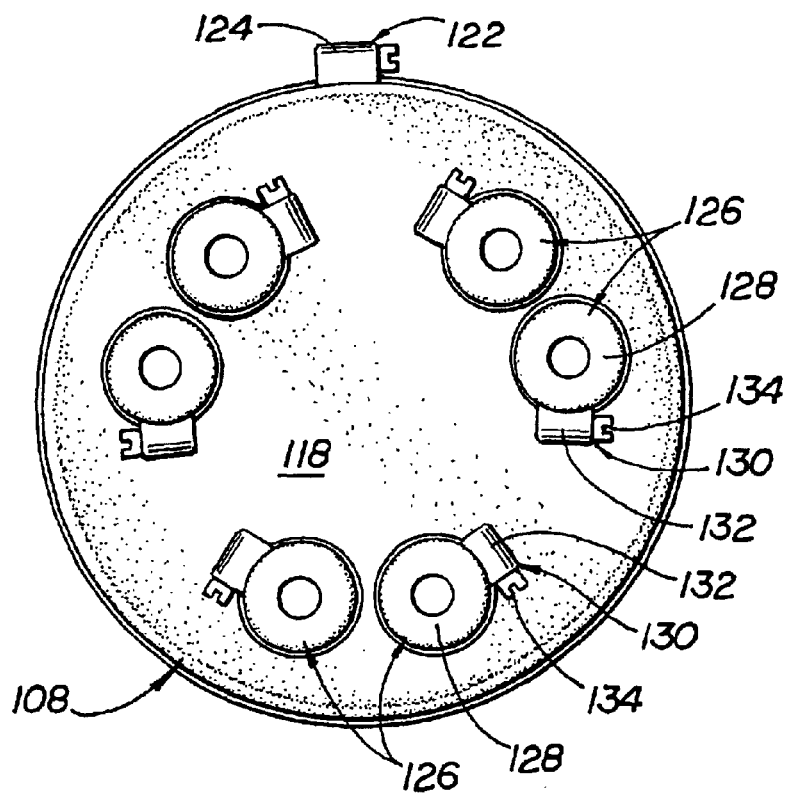
FIG. 4C is a bottom plan view of an embodiment of the cap.

In a first embodiment, referring now to FIGS. 3–4C, a casing 100 is provided within chamber 54, the casing 100 defining a space therein capable of enclosing the distribution component subassembly 44. The casing 100 may be watertight, such that unwanted moisture and corrosive effects on the distribution component subassembly 44 are minimized. A selected one of the male plug 80 or female inlet 78 is electrically connected to the distribution component subassembly 44 and may be mounted on the casing 100. The casing 100 defines an aperture 102 therein, and includes a closure member 104 which covers the aperture 102 and provides a watertight seal.

The casing 100 may be of any desired shape. In one example, the casing 100 is made up of a pot 106 having the aperture 102 therein, and, as seen in FIGS. 4B and 4C, a cap 108 which makes up the closure member 104, covering and sealing the aperture 102. The pot 106 has a substantially cylindrical body 110 having a closed end 112 and an opposite open end 114 which defines the aperture 102. The cylindrical body 110 may be fabricated of 4" diameter PVC tubing, sealed at the closed end 112 with a PVC cover 116 sealed to the tubing with epoxy or other watertight adhesive (not shown). The distribution component subassembly 44 is contained within the pot 106 and is accessible through the aperture 102. Such an embodiment of the casing 100, when inserted into the chamber 54 with the open end 114 facing downward, forms a natural air pocket in the sealed interior of the casing 100. This air pocket acts as a back-up to the cap 108, which provides an air-tight seal around the open end 114 of the enclosure. In any event, the casing 100 should be of sufficient outside dimensions to fit within the interior of the chamber 54.

When the distribution component subassembly 44 is placed within the pot 106 or other embodiment of the casing 100, it may be secured therein and further insulated from water or contaminants by "potting" the distribution component subassembly 44 within the pot 106. A settable epoxy material (not shown) may be poured into the pot 106 and surrounding the distribution component subassembly 44, such that only lead wires for connection to the electrical feeder wires 28, 30 protrude from the hardened epoxy.

The cap 108 is sized to fit over the open end 114 of the pot 106, and is capable of sealingly engaging the open end 114. The cap 108 is made up of a generally round member 118 having a continuous shoulder 120 extending around the circumference of the round member 118, and complementarily sized to be capable of sealingly receiving the open end 114 of the pot 106. In one example, the cap 108 contains two seals (not shown) on the inner diameter 121 of the shoulder 120 which contact the open end 114 of the pot 106, for double protection against water and moisture penetration. A clamping mechanism 122, such as a stainless steel hose clamp 124, may be attached over the cap 108 and tightened to provide a water tight seal. Alternately, any construction of the cap 108 which provides a water tight seal may be utilized, such as a threaded engagement with the cylindrical body 110 of the pot 106. The cap 108 may be constructed of rubber or other resilient materials, including flexible PVC resin.

The casing 100 defines a plurality of ports 126 therethrough, each capable of sealingly engaging the incoming and outgoing feeder wires 28, 30 passing therethrough, providing watertight access for incoming and outgoing feeder wires 28, 30. In one embodiment, the plurality of ports 126 is disposed on the cap 108. In such a configuration, each port 126 is defined by a resilient sleeve 128, having a clamp 130 extending therearound, such as a stainless steel hose clamp 132, which may be tightened to constrict the sleeve 128 to sealingly engage a feeder wire 28, 30. The clamp 130 may be secured with one bolt 134 for easy access. While not required, construction of the ports 126 with a resilient material such as rubber or flexible PVC resin is beneficial, as a watertight seal is made possible with a wide range of feeder wire diameters. In turn, use of parts having a single selected port diameter is made possible in a wider range of installation environments. Resilient ports 126 with a 0.375" inner diameter, which are capable of sealingly engaging wire diameters between #10 AWG THHN (0.162" nominal outside diameter) and #2 AWG THHN (0.381 nominal outside diameter) have been utilized and found to be desirable.

Figure 5:
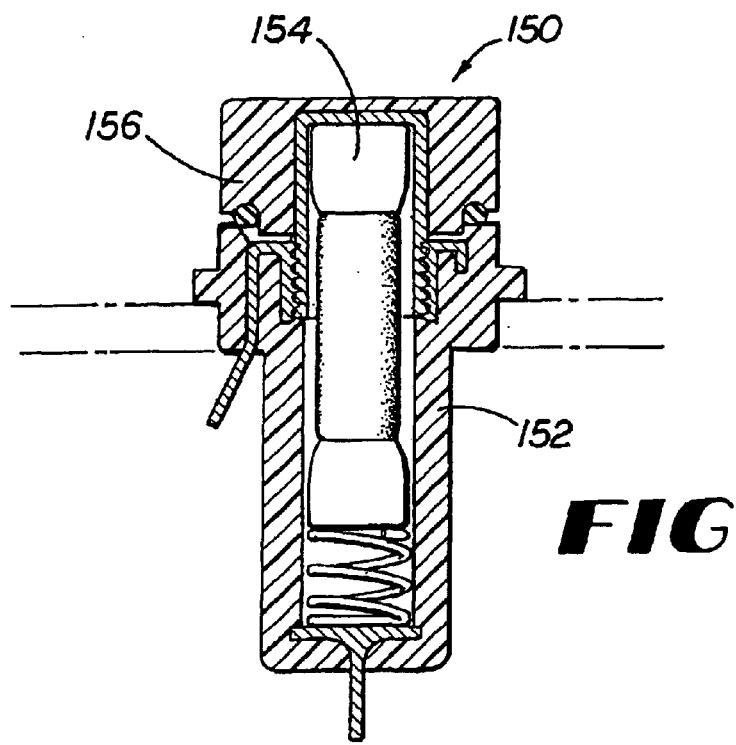
FIG. 5 is a vertical cross-sectional view of an embodiment of an external fuse.
Figure 6:
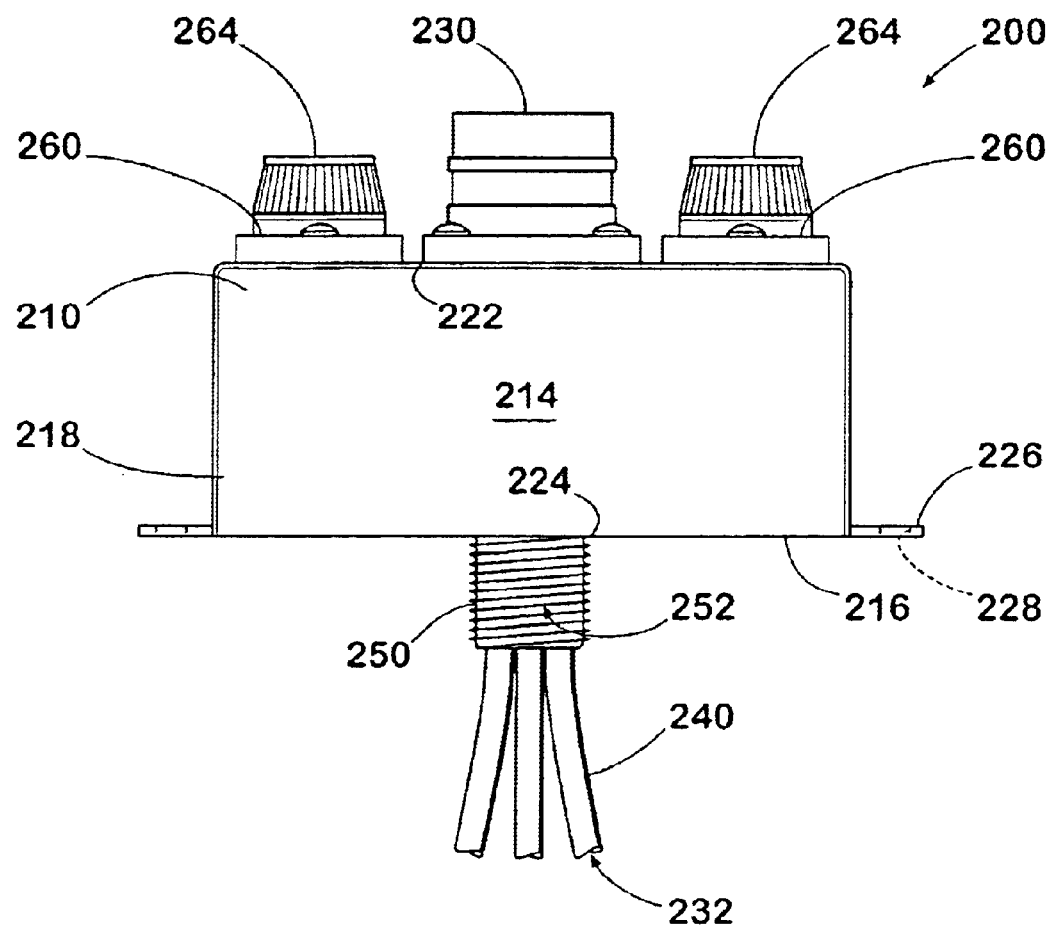
FIG. 6 is a side view of a second embodiment of the power distribution assembly.
Figure 7:
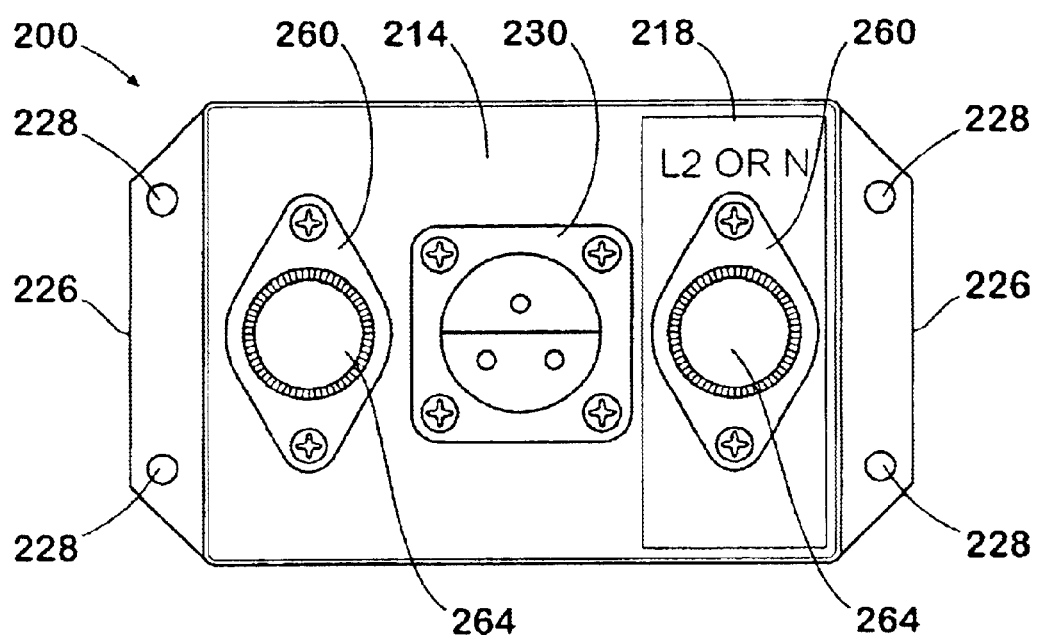
FIG. 7 is a top plan view of the second embodiment of the power distribution assembly.
Figure 8:
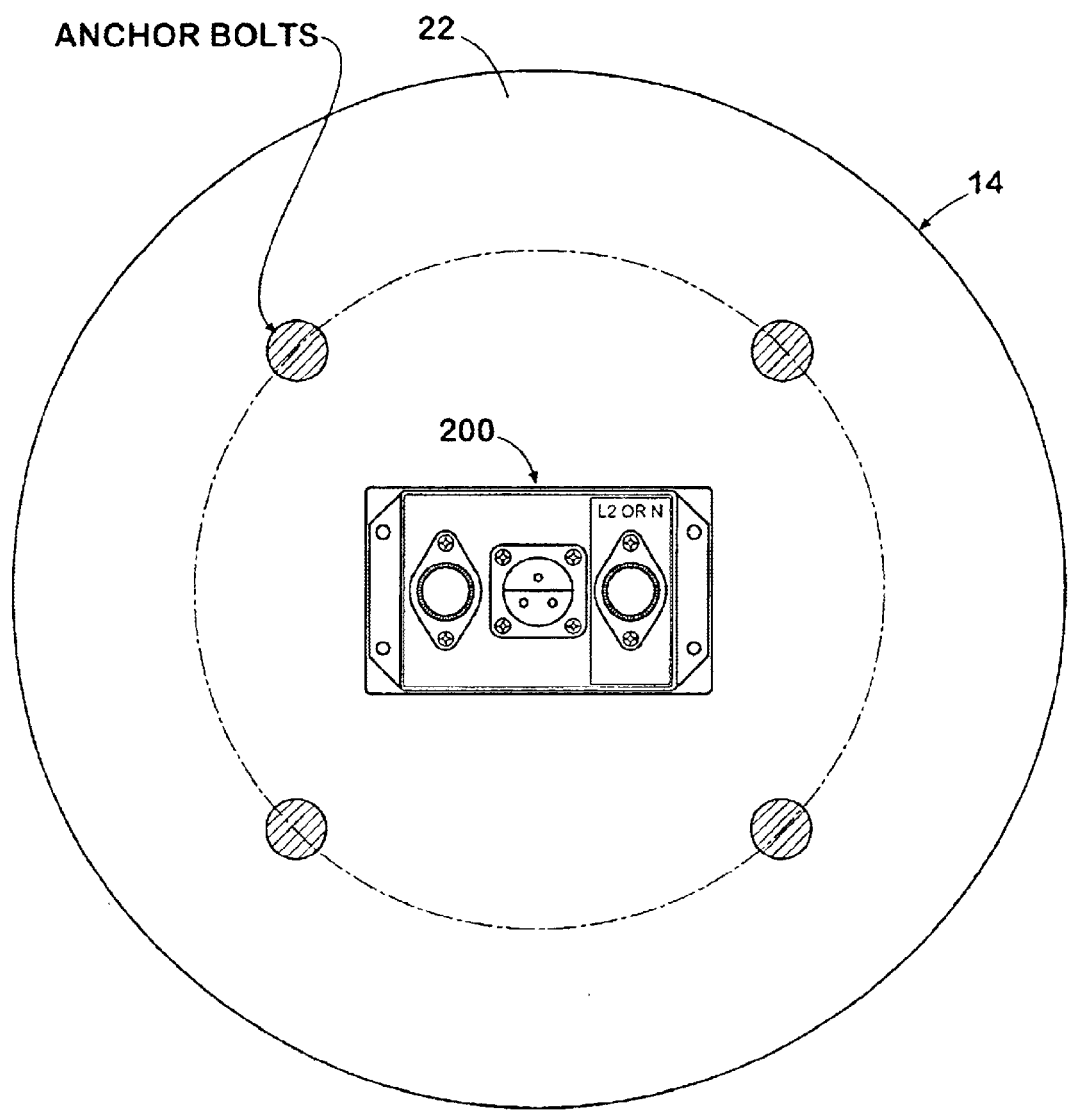
FIG. 8 is a top plan view of the second embodiment of the power distribution assembly disposed onto a planar surface of a foundation.

Referring now to FIGS. 4A and 5, the casing 100 may further provide watertight and externally accessible fusing for the distribution component subassembly 44. One or more external fuses 150 may be provided in the casing 100, each including a fuse port 152, capable of receiving a fuse 154 therein. The fuse port 152 provides electrical connection to the distribution component subassembly 44 when a fuse 154 is inserted therein and a corresponding fuse cap 156 is affixed in place. The fuse cap 156 may be constructed to sealingly engage the fuse port 152 when installed, such that electrical connection and a watertight seal are maintained. For example, threaded connection, a snap-in connection, a magnetic connection, or other selectively detachable connections capable of providing and maintaining a watertight relation between the fuse port 152 and fuse cap 156 may be used.

Referring again to FIG. 3, in this embodiment, two fuses 150 are provided, each on the casing 100 and accessible from the outside of the casing 100. By providing external access to the fuses 154 within the distribution component subassembly 44, failed fuses 154 may be replaced with a minimum of effort and maintenance. Further, no splicing of wires is required for fuse replacement, nor is dismantling of the casing 100 required. Suitable fuses 150 are commercially available from several manufacturers, including catalog number HPF-WT, rated at 30 amps, 600 volts, from Bussman, Inc. in St. Louis, Mo.

In another embodiment, a waterproof built-in "breakaway" fuse kit design (not shown) is molded and wired into the female side of the electrical breakaway connector. The breakaway fuse design prevents broken wires and the de-energization of a complete circuit when one component, such as a mast 12, fails due to vehicular impact. The waterproof breakaway fuse kits separate safely under tension, retaining the fuse in the harmless load side, eliminating danger and electrical shock. Spring loaded socket contacts maintain the integrity of the breakaway connection by compensating automatically for thermal expansion due to standard loading cycling. These waterproof breakaway fuse kits may be designed specifically for highway lighting, area lighting, flood lighting, and power distribution circuits. The fuses will accommodate a wire range of #14 to #1/0 AWG. All fuse kits are rated for 30 amp, 600 volts. Suitable fused breakaway connector kits are available from Buchanan Construction Products, Inc., 101 Bilby Road, Hackettstown, N.J. 07840.

Also according to the first embodiment of the invention, a method of constructing a mast lighting system 10 is now disclosed. According to the method, a chamber 54 is formed within the foundation 14 of sufficient dimensions to receive the distribution component subassembly 44 therein. The power distribution assembly is then disposed onto the surface of the foundation and within the interior chamber of the mast The power source is then electrically connected to the distribution component subassembly 44, and distribution component subassembly 44 is electrically connected to the first electrical cable 42.

Referring now to FIGS. 6–11, a second embodiment of the mast lighting system 10 is shown. Here, a power distribution assembly 200 is provided that has a casing 210 and a distribution component subassembly 44 disposed within an interior 212 of the casing. The casing has an upper portion 214, a bottom portion 216, a side wall 218, and defines a plurality of openings 220. In one aspect, the plurality of openings includes a first opening 222 and a second opening 224. The first opening may be defined in the upper portion 214 of the casing 210 and the second opening may be defined in the bottom portion 216 of the casing. In one example, the bottom portion 216 of the casing is substantially planar.

The power distribution assembly may include an electrical cable 240 that is in communication with the distribution component assembly 44. In one example, a portion of the electrical cable passes through the second opening 224. Due to the potentially adverse weather conditions to which the power distribution assembly would likely be exposed, the second opening 224 of the casing may be sealed in a conventional manner, such as, for example, a conventional chemical sealant, about a portion of the electrical cable 240 so that the casing 210 of the power distribution assembly is substantially moisture proof.

The distribution component subassembly 44 is in communication with a first detachable connector 230 that forms a portion of the watertight breakaway connector set 76. The first detachable connector 230 is constructed and arranged to form a substantially moisture proof connection to the first opening of the casing. In use, for example, the first detachable connector 230 may comprise a male plug or a female socket. As described above, the first detachable connector 230 and a second detachable connector 232 of the breakaway connector set 76 are constructed and arranged for disconnecting in response to an application of a tensile and/or shear force that is less than necessary to damage any one of the first detachable connector 230, the distribution component subassembly 44, and/or the electrical cable 240.

The casing 210 may also include at least one flange 226 that extends from a portion of the side wall 218 of the casing. The flange 226 may extend from the side wall substantially co-planar to a plane defined by the bottom portion of the casing. Each flange 226 defines a bore 228 that extends therethrough the flange from a top surface to a bottom surface.

The power distribution assembly 200 may also include a tubular male protrusion 250 that is connected to and extends from the second opening 224 in the bottom portion of the casing 210. As one will appreciate, a portion of the electrical cable 240 passes through and extends from the tubular male protrusion. The male protrusion is constructed and arranged for overlying registration with a portion of an interior surface of the conduit 24 of the foundation. In one example, at least a portion of an exterior surface 252 of the male protrusion is sized so that the at least a portion of the exterior surface closely overlies and/or engages a portion of the interior surface of the conduit of the foundation. Alternatively, the male protrusion 250 may be sized so the exterior surface 252 of the male protrusion is spaced from the interior surface of the conduit 24.

The male protrusion 250 may extend substantially transverse to the bottom portion of the casing. In one example, the male protrusion may have a longitudinal length extending from the bottom portion of the casing that is greater that about the length of a radius of the interior bore of the conduit. Alternatively, the longitudinal length of the male protrusion is at least about 150% of the length of a radius of the interior bore of the conduit. In another example, when connected to the bottom portion of the casing, the male protrusion may preferably have a longitudinal length of at least ½ inch. More preferably, the male protrusion may have a longitudinal length of about and between approximately 1 inch to 24 inches. Alternatively, the male protrusion may preferably have a longitudinal length of about and between approximately 1 inch to 36 inches. Still more preferably, the male protrusion may have a longitudinal length of about and between approximately ½ inch to 48 inches.

Referring to FIG. 9, the tubular male protrusion 250 may be formed from at least one tube. For example, the male protrusion may comprise a first tube 254 and a second tube 256. In this example, the first tube 254 is constructed and arranged to form a substantially moisture proof connection to the second opening 224 of the casing 210. The second tube 256 may be coupled to the first tube 254 proximate a portion of a distal end of the first tube 254. In use, the first and second tubes may be positioned so that they are substantially co-axial. The second tube 256 may be coupled to the first tube 254 by, for example, conventional mechanical connections, fasteners, and/or chemical adhesives.

In one example, the power distribution assembly 200 may be delivered to the work site with the first tube mounted thereto the casing and an appropriately sized second tube may be connected to the first tube in the field so that the formed male protrusion is the desired longitudinal length. In this example, at least a portion of the interior of the tubular male protrusion 250 may be sealed in a conventional manner, such as, for example, a conventional chemical sealant, about the electrical cable 240 so that the casing 210 of the power distribution assembly is substantially moisture proof.

As shown in the figures, at least one fuse port 260, such as, for example, the 571 Series made be Little Fuse U.S.A., is connected to one opening in the plurality of openings in the casing. The exemplified fuse port is constructed and arranged to form a substantially moisture proof connection to the respective opening. As one skilled in the art will appreciate, each fuse port is in operative communication with the distribution component assembly. The fuse port(s) may be positioned anywhere on the casing. In one example, the fuse port is connected to an opening defined in the upper portion 214 of the casing. Each fuse port defines a fuse cavity 262 that is constructed and arranged for operative receipt of a conventional fuse 66 and has a cap member 264 that is constructed and arranged to releaseably enclose the fuse within the fuse cavity.

In the second embodiment of the mast lighting system 10, the mast 12 is conventionally mounted to the surface 22 of the foundation 14 so that the proximate end 34 of the mast is positioned in overlying registrations with the aperture 25 of the central conduit 24. When affixed to the foundation, the mast 12 defines an interior chamber 33 within the mast. The first electrical cable 42, disposed within the interior of the mast, is in communication with the electrical component and the second detachable connector 232. In use, the casing of the power distribution assembly is disposed within the interior chamber 33 of the mast and is placed onto the generally planar surface 22 of the foundation. The second opening 224 of the casing 210 is placed in substantial registration with the aperture 25 of the conduit. As one will appreciate, the handhole 70 of the mast opens into the interior chamber 33 so that the distribution component subassembly 44 is accessible to maintenance or installation personnel, which simplifies installation or repair to the mast lighting system.

The first detachable connector 230 is detachable mated to the second detachable connector 232 to form the breakaway connector set 76. Thus, power from the remote power source may be communicated through the distribution component subassembly to the electrical component on the mast.

The second electrical cable 232, which is at least partially disposed within the central conduit 24, is in communication with a remote power source and is in communication with the distribution power subassembly 44. One skilled in the art will appreciate that the second electrical cable 232 may comprise the electrical cable 240 and a separate electrical cable 242 disposed at least partially within the conduit 24 and in communication with the remote power source. In one example, the electrical cable 240 and the electrical cable 242 may be spliced together in conventional fashion to form the second electrical cable 232.

In this embodiment, because the casing 210 of the power distribution assembly 200 is positioned onto the surface 22 of the foundation and is not positioned within a portion of the conduit 24, the conduit may be any conventional size, for example, 2 inch PCV piping, which is suitable for passing electrical power cable.

In the second embodiment, the contractor is no longer required to coordinate the forming of the chamber 54 within the foundation 14 during the pouring of the foundation. Also, there is no need for the contractor to make electrical connections within the interior of the formed chamber 54. In one example, the electrical cable 240 could be connected to the electrical cable 242 outside of, or within, the interior chamber 23 of the mast 12 and the connected cables 240, 242 could subsequently be inserted down the conduit 24 as the power distribution assembly 200 is being placed onto the surface 22 of the foundation. Alternatively, the electrical cable 240 could be inserted into the conduit 24 and be connected to the electrical cable 242 at a remote junction or manhole box.

As shown in FIG. 10, the power distribution assembly 200 may have a height that is less than the distance from the surface of the foundation to the top of the anchor bolts that define the highest part of the foundation. Thus, when the power distribution assembly is disposed onto the surface of the foundation, no portion of the power distribution assembly protrudes above the horizontal plane marked by the highest point of the foundation. Thus, the power distribution assembly 200 is protected from side impact damage that may result from auto accidents or collisions.

Referring to FIG. 9, the power distribution assembly 200 of the present invention may be mounted relative to the foundation 14 by several mounting arrangements. These arrangements may be used in combination or may be used individually. In all the arrangements, movement of the power distribution assembly 200 relative to the surface 22 of the foundation is limited. This allows the force that may be applied to the breakaway connector set 76 by collisions and the like to cause the separation of the first and second electrical connectors 230, 232 without damage to the power distribution assembly 200.

For example, at least one fastener 270 may be used to releasably fix the flange 226 of the casing 210 to the underlying surface 22 of the foundation. As one will appreciate, each fastener 270 is constructed and arranged for passing through the bore 228 of the flange into the underlying surface of the foundation. Thus, the fasteners help limit movement of the power distribution assembly relative to the foundation.

Alternatively, the central conduit 24 has a spaced distal end that defines an opening 282 in a manhole box 280 that is positioned remote from the mast. The manhole box is constructed and arranged to be readily accessible for maintenance and installation personnel. A portion of the second electrical cable 232 passes through the distal end of the conduit and into the manhole box. The system includes a conventional wire restraint member 290 that is constructed and arranged for connection to the portion of the second electrical cable that passes out of the distal end of the conduit into the manhole box. In use, the wire restraint member 290 is typically connected to the second electrical cable proximate the opening in the manhole box after the second electrical cable disposed within the conduit has been drawn toward and through the distal end of the conduit to substantially remove slack in the second electrical cable. The wire restraint member 290 has a diameter greater than the diameter of the opening 282 in the manhole box 280. Thus, if force is applied to the power distribution assembly 200 that would tend to move the assembly relative to the foundation, the wire restraint member 290 would be drawn tightly against the opening 282 and the length of the second electrical cable between the wire restraint member and the distribution component subassembly would serve to limit the relative movement of the power distribution assembly.

In another exemplary mounting arrangement, if the power distribution assembly 200 has the male protrusion 250 extending therefrom, the male protrusion can be inserted through the aperture 25 and into the conduit 24. As one will appreciate, in the event of a collision, the male protrusion limits the relative movement of the power distribution assembly.

According to the second embodiment of the invention, an exemplary method of constructing a mast lighting system 10 is now disclosed. According to the method, the distribution component subassembly 44 of the power distribution assembly 200 is connected to the remote power source. The power distribution assembly 200 is disposed onto the foundation 14 and within the interior chamber 33 of the mast 12 such that the second opening in the bottom portion of the casing is in overlying registration with the conduit. If the power distribution assembly has the tubular male protrusion 250, the power distribution assembly is disposed onto the foundation so that the male protrusion is disposed at least partially therein the conduit 24 of the foundation. The first detachable connector 230 is connected to the second detachable connector 232 so that the electrical component of the mast is in communication with the distribution component subassembly and hence to the power source.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A mast lighting system, comprising:
   a. a foundation, a portion of the foundation having a generally planar surface that defines an aperture for a conduit therein;
   b. a tubular mast having a proximate end and a spaced distal end, a portion of the mast being constructed and arranged to support an electrical component, said the proximate end being mounted to the surface of the foundation in overlying registration with the aperture and defining an interior chamber therein;
   c. a power distribution assembly comprising:
      i. a casing defining a plurality of openings therein, the casing having a bottom portion, the plurality of openings including a first opening and a second opening, the second opening being defined in the bottom portion of the casing; and
      ii. a distribution component subassembly disposed within an interior of the casing, the distribution component subassembly having a first detachable connector connected to the first opening, wherein the casing is disposed within the interior chamber of the mast and is placed on the generally planar surface of the foundation such that the second opening of the casing is in registration with the conduit;
   d. a power source; and
   e. a first electrical cable disposed within the mast and in communication with the electrical component thereof and a second detachable connector; and
   f. a second electrical cable in communication with the power source and the distribution component subassembly,
   wherein the first detachable connector is detachable mated to the second detachable connector.

2. The mast lighting system of claim 1, wherein the power distribution assembly is substantially moisture proof.

3. The mast lighting system of claim 2, wherein a portion of the second electrical cable extends therethrough at least a portion of the conduit, the aperture, and the second opening in the bottom portion of the casing.

4. The mast lighting system of claim 3, wherein the second opening of the casing is sealed about the portion of the second electrical cable passing.

5. The mast lighting system of claim 2, wherein the first detachable connector is constructed and arranged to form a substantially moisture proof connection to the first opening in the casing.

6. The mast lighting system of claim 3, wherein the conduit has an interior bore, further comprising a tubular male protrusion connected to and extending from the second opening in the bottom portion of the casing, wherein a portion of the second electrical cable passes therethrough the male protrusion, the male protrusion extending into the interior bore of the conduit of the foundation.

7. The mast lighting system of claim 6, wherein the male protrusion extends substantially transverse to the bottom portion of the casing.

8. The mast lighting system of claim 6, wherein the male protrusion is constructed and arranged for overlying registration with a portion of an interior surface of the conduit of the foundation.

9. The mast lighting system of claim 6, wherein the male protrusion has a longitudinal length extending from the bottom portion of the casing that is greater than about the length of a radius of the interior bore of the conduit.

10. The mast lighting system of claim 6, wherein the male protrusion has a longitudinal length extending from the bottom portion of the casing that is at least about 150% of the length of a radius of the interior bore of the conduit.

11. The mast lighting system of claim 6, wherein the male protrusion has a longitudinal length extending from the bottom portion of the casing that is about and between about approximately ½ inch to 48 inches.

12. The mast lighting system of claim 6, wherein the male protrusion has a longitudinal length extending from the bottom portion of the casing that is about at least ½ inch.

13. The mast lighting system of claim 6, wherein the male protrusion comprises a first tube and a second tube, wherein the first tube is constructed and arranged to form a substantially moisture proof connection to the second opening of the casing, and wherein the second tube is coupled to a portion of a distal end of the first tube.

14. The mast lighting system of claim 13, wherein the first tube and the second tube are substantially co-axial.

15. The mast lighting system of claim 1, wherein the first detachable connector comprises a male plug.

16. The mast lighting system of claim 1, wherein the first detachable connector comprises a female socket.

17. The mast lighting system of claim 1, wherein the first detachable connector and the second detachable connector are each constructed and arranged for disconnecting in response to an application of a force that is less than the force necessary to damage the first detachable connector.

18. The mast lighting system of claim 1, wherein the first detachable connector and the second detachable connector are each constructed and arranged for disconnecting in response to an application of a force that is less than the force necessary to damage any one of the electrical cable, the first detachable connector, or the distribution component subassembly.

19. The mast lighting system of claim 1, wherein the casing has a side wall and the bottom portion of the casing defines a plane, and wherein the casing has at least one flange extending from the side wall of the casing substantially co-planar to the plane of the bottom portion of the casing.

20. The mast lighting system of claim 19, wherein the at least one flange has a bore extending therethrough.

21. The mast lighting system of claim 20, further comprising at least one fastener, each fastener being constructed and arranged for passing through the bore of the flange and into the foundation.

22. The mast lighting system of claim 1, wherein the conduit has a spaced distal end, and further comprises a wire restraint member constructed and arranged for connection to a portion of the second electrical cable passing through the distal end of the conduit, wherein the wire restraint member has a diameter greater than a diameter of the distal end of the conduit.

23. The mast lighting system of claim 1, wherein the power distribution assembly further comprises at least one fuse port connected to one opening in the plurality of openings in the casing, each fuse port defining a fuse cavity constructed and arranged for operative receipt of a fuse, and having a cap member constructed and arranged to releaseably enclose the fuse within the fuse cavity and to selectively form a substantially moisture proof connection to the opening in the casing, wherein each fuse port is in communication with the distribution component subassembly.

24. A mast lighting system, comprising:
  a. foundation defining an aperture for a conduit therein, the conduit having an interior bore;
  b. a tubular mast having a proximate end and a spaced distal end, a portion of the mast being constructed and arranged to support an electrical component, the proximate end being mounted to the foundation in registration with the aperture and defining an interior chamber therein;
  c. a power distribution assembly comprising:
    i. a casing defining a plurality of openings therein, the casing having a bottom portion, the plurality of openings including a first opening and a second opening, the second opening being defined in the bottom portion of the casing;
    ii. a tubular male protrusion connected to and extending from the second opening in the bottom portion of the casing; and
    ii. a distribution component subassembly disposed within the casing, the distribution component subassembly having a first detachable connector connected to the first opening, wherein the casing is disposed within the interior chamber of the mast and is placed on the foundation such that the male protrusion extends into the interior bore of the cavity of the foundation;
  d. a power source; and
  e. a first electrical cable disposed within the mast and in communication with the electrical component and a second detachable connector; and
  f. a second electrical cable in communication with the power source and the distribution component subassembly,
  wherein the first detachable connector is detachable mated to the second detachable connector.

25. The mast lighting system of claim 24, wherein a portion of the second electrical cable extends therethrough at least a portion of the conduit, the male protrusion, and the second opening in the bottom portion of the casing.

26. The mast lighting system of claim 25, wherein the second opening of the casing is sealed about the portion of the second electrical cable passing therethrough.

27. The mast lighting system of claim 24, wherein the first detachable connector is constructed and arranged to form a substantially moisture proof connection to the first opening in the casing.

28. The mast lighting system of claim 24, wherein the male protrusion extends substantially transverse to the bottom portion of the casing.

29. The mast lighting system of claim 24, wherein the male protrusion being constructed and arranged for overlying registration with a portion of an interior surface of the conduit of the foundation.

30. The mast lighting system of claim 24, wherein the male protrusion has a longitudinal length extending from the bottom portion of the casing that is greater than about the length of a radius of the interior bore of the conduit.

31. The mast lighting system of claim 24, wherein the male protrusion has a longitudinal length extending from the bottom portion of the casing that is at least about 150% of the length of a radius of the interior bore of the conduit.

32. The mast lighting system of claim 24, wherein the male protrusion has a longitudinal length extending from the bottom portion of the casing that is about and between about approximately ½ inch to 48 inches.

33. The mast lighting system of claim 24, wherein the male protrusion has a longitudinal length extending from the bottom portion of the casing that is at least ½ inch.

34. The mast lighting system of claim 24, wherein the male protrusion comprises a first tube and a second tube, wherein the first tube is constructed and arranged to form a substantially moisture proof connection to the second opening of the casing, and wherein the second tube is coupled to a portion of a distal end of the first tube.

35. The mast lighting system of claim 34, wherein the first tube and the second tube are substantially co-axial.

36. The mast lighting system of claim 24, wherein the first detachable connector and the second detachable connector are each constructed and arranged for disconnecting in response to an application of a force that is less than the force necessary to damage any one of the electrical cable, the first detachable connector, or the distribution component subassembly.

37. The mast lighting system of claim 24, wherein the power distribution assembly further comprises at least one fuse port connected to one opening in the plurality of openings in the casing, each fuse port defining a fuse cavity constructed and arranged for operative receipt of a fuse, and having a cap member constructed and arranged to releaseably enclose the fuse within the fuse cavity and to selectively form a substantially moisture proof connection to the opening in the casing, wherein each fuse port is in communication with the distribution component subassembly.

38. A power distribution assembly for a mast lighting system having a power source, comprising:
- a casing defining a plurality of openings therein, the plurality of openings including a first opening and a second opening, the first opening defined in an upper portion of the casing and the second opening defined in a bottom portion of the casing; and
- a distribution component subassembly disposed within of the casing, the distribution component subassembly having a first detachable connector being constructed and arranged to form a substantially moisture proof connection to the first opening; and
- an electrical cable in communication with the distribution component subassembly and the power source, a portion of the electrical cable passing therethrough the second opening, wherein the second opening of the casing is sealed to the portion of the electrical cable so that the casing of the power distribution assembly is substantially moisture proof.

39. The power distribution assembly of claim 38, wherein the first detachable connector comprises a male plug.

40. The power distribution assembly of claim 38, wherein the first detachable connector comprises a female socket.

41. The power distribution assembly of claim 38, wherein the first detachable connector is constructed and arranged for disconnecting in response to an application of a force that is less than the force necessary to damage any one of the first detachable connector or the distribution component subassembly.

42. The power distribution assembly of claim 38, wherein the bottom portion of the casing is substantially planar.

43. The power distribution assembly of claim 42, wherein the casing has a side wall, and wherein the casing has at least one flange extending from the side wall of the casing substantially co-planar to the bottom portion of the casing.

44. The power distribution assembly of claim 43, wherein the at least one flange has a bore extending therethrough.

45. The power distribution assembly of claim 38, further comprising a tubular male protrusion connected to and extending from the second opening in the bottom portion of the casing, wherein a portion of the electrical cable passes through the male protrusion.

46. The power distribution assembly of claim 45, wherein the male protrusion extends substantially transverse to the bottom portion of the casing.

47. The power distribution assembly of claim 45, wherein the male protrusion has a longitudinal length extending from the bottom portion of the casing that is about and between about approximately 1 inch to 24 inches.

48. The power distribution assembly of claim 45, wherein the male protrusion has a longitudinal length extending from the bottom portion of the casing that is at least one inch.

49. The power distribution assembly of claim 45, wherein the male protrusion comprises a first tube and a second tube, wherein the first tube is constructed and arranged to form a substantially moisture proof connection to the second opening of the casing, and wherein the second tube is coupled to a portion of a distal end of the first tube.

50. The power distribution assembly of claim 49, wherein the first tube and the second tube are substantially co-axial.

51. The power distribution assembly of claim 38, further comprising at least one fuse port connected to one opening in the plurality of openings in the casing, each fuse port defining a fuse cavity constructed and arranged for operative receipt of a fuse, and having a cap member constructed and arranged to releaseably enclose the fuse within the fuse cavity and to selectively form a substantially moisture proof connection to the opening in the casing, wherein the fuse port is in communication with the distribution component subassembly.

52. The power distribution assembly of claim 51, wherein each fuse port is positioned on a portion of the upper portion of the casing.

53. A power distribution assembly for a mast lighting system having a power source, comprising:
- a casing defining a plurality of openings therein, the plurality of openings including a first opening and a second opening, the first opening defined in an upper portion of the casing and the second opening defined in a bottom portion of the casing;
- a tubular male protrusion connected to and extending from the second opening in the bottom portion of the casing;
- a distribution component subassembly disposed within the casing, the distribution component subassembly having a first detachable connector constructed and arranged to form a substantially moisture proof connection to the first opening; and
- an electrical cable in communication with the distribution component subassembly and the power source, a portion of the electrical cable passing through the male protrusion and the second opening, wherein the second opening of the casing is sealed to the portion of the electrical cable so that the casing of the power distribution assembly is substantially moisture proof.

54. The power distribution assembly of claim 53, wherein the first detachable connector is constructed and arranged for disconnecting in response to an application of a force that is less than the force necessary to damage any one of the first detachable connector or the distribution component subassembly.

55. The power distribution assembly of claim 53, wherein the male protrusion has a longitudinal length extending from the bottom portion of the casing that is at least ½ inch.

56. The power distribution assembly of claim 53, wherein the male protrusion comprises a first tube and a second tube, wherein the first tube is constructed and arranged to form a substantially moisture proof connection to the second opening of the casing, and wherein the second tube is coupled to a portion of a distal end of the first tube.

57. The power distribution assembly of claim 56, wherein the first tube and the second tube are substantially co-axial.

58. A method of constructing a mast lighting system of the type including at least one tubular mast having a proximate end, a spaced distal end and defining an interior chamber, a portion of the mast constructed and arranged to support an electrical component and the proximate end mounted to a foundation that defines a conduit extending into the ground, a first electrical cable in communication with the electrical component and a second detachable connector, comprising:
  a. disposing a power distribution assembly onto the foundation and within the interior chamber of the mast, the power distribution assembly comprising:

i. a casing defining a first opening in an upper portion of the casing and a second opening in a bottom portion of the casing, the casing positioned onto the foundation such that the second opening is in overlying registration with the conduit;
ii. a tubular male protrusion connected to and extending from the second opening in the bottom portion of the casing; and
iii. a distribution component subassembly disposed within an interior of the casing, the distribution component subassembly having a first detachable connector connected to the first opening of the casing;

b. mating the first detachable connector to the second detachable connector so that the electrical component is in communication with the distribution component subassembly; and c. connecting the distribution component subassembly to a power source, wherein the power distribution assembly is disposed onto the foundation so that the male protrusion is disposed at least partially therein the conduit of the foundation.

59. The method of claim 58, wherein the power distribution assembly has a second electrical cable that is connected to the distribution subassembly, wherein the second electrical cable extends therethrough the male protrusion and the second opening.

60. The method of claim 59, wherein connecting the distribution component subassembly includes connecting the second electrical cable to the power source.

61. The method of claim 60, wherein, prior to disposing the power distribution assembly, further comprising sealing the second opening about a portion of the second electrical cable to form a substantially moisture proof seal.

* * * * *